(12) United States Patent
Linke

(10) Patent No.: US 11,966,599 B2
(45) Date of Patent: *Apr. 23, 2024

(54) METHOD AND SYSTEM FOR LOW LATENCY DATA MANAGEMENT

(71) Applicant: BlackBerry Limited, Waterloo (CA)

(72) Inventor: Scott Lee Linke, Fort Collins, CO (US)

(73) Assignee: BlackBerry Limited, Waterloo (CA)

( * ) Notice: Subject to any disclaimer, the term of this patent is extended or adjusted under 35 U.S.C. 154(b) by 130 days.

This patent is subject to a terminal disclaimer.

(21) Appl. No.: 17/542,023

(22) Filed: Dec. 3, 2021

(65) Prior Publication Data
US 2022/0171550 A1 Jun. 2, 2022

Related U.S. Application Data

(63) Continuation of application No. 15/821,390, filed on Nov. 22, 2017, now Pat. No. 11,209,997.

(51) Int. Cl.
| | | |
|---|---|---|
| *G06F 16/958* | (2019.01) | |
| *G06F 3/06* | (2006.01) | |
| *G06F 9/54* | (2006.01) | |
| *H04L 41/5054* | (2022.01) | |
| *H04L 47/62* | (2022.01) | |

(52) U.S. Cl.
CPC .......... *G06F 3/0631* (2013.01); *G06F 3/0604* (2013.01); *G06F 3/0611* (2013.01); *G06F 3/064* (2013.01); *G06F 3/0646* (2013.01); *G06F 3/0656* (2013.01); *G06F 3/0665* (2013.01); *G06F 3/0673* (2013.01); *G06F 3/0677* (2013.01); *G06F 3/0679* (2013.01); *G06F 3/0682* (2013.01); *G06F 3/0683* (2013.01); *G06F 9/542* (2013.01); *G06F 16/986* (2019.01);

(Continued)

(58) Field of Classification Search
CPC .................................................. G06F 16/986
See application file for complete search history.

(56) References Cited

U.S. PATENT DOCUMENTS

| 5,961,606 A | 10/1999 | Talluri |
| 6,275,916 B1 | 8/2001 | Weldon, Jr. |

(Continued)

FOREIGN PATENT DOCUMENTS

| EP | 0766170 A1 | 4/1997 |
| WO | 0076222 A1 | 12/2000 |

OTHER PUBLICATIONS

Linke, Scott Lee; U.S. Appl. No. 17/825,707, filed May 26, 2022; Title: Method and System for Low Latency Data Management; 44 pages.

(Continued)

*Primary Examiner* — Richard L Bowen
(74) *Attorney, Agent, or Firm* — Conley Rose, P.C.; J. Robert Brown, Jr.

(57) ABSTRACT

A method at a computing device for data management between a publisher and at least one subscriber, the method including receiving, at a system element, memory requirements from the publisher; creating a memory allocation of a pool of data objects for the publisher based on the received memory requirements; receiving, at the system element, consumption criteria from each of the at least one subscriber; and adjusting the memory allocation of the pool of data objects based on the consumption criteria received from the at least one subscriber.

20 Claims, 8 Drawing Sheets

(52) U.S. Cl.
CPC ...... *H04L 41/5054* (2013.01); *H04L 47/6245* (2013.01)

(56) References Cited

U.S. PATENT DOCUMENTS

| | | | |
|---|---|---|---|
| 6,446,087 | B1 | 9/2002 | Lai |
| 6,917,942 | B1 | 7/2005 | Burns |
| 6,925,515 | B2 | 8/2005 | Burns |
| 9,052,942 | B1 | 6/2015 | Barber |
| 9,325,585 | B1 | 4/2016 | Wang et al. |
| 9,858,199 | B1 | 1/2018 | Olgiati |
| 10,831,670 | B2 | 11/2020 | Linke |
| 11,209,997 | B2 | 12/2021 | Linke |
| 2003/0023825 | A1 | 1/2003 | Woo et al. |
| 2004/0267694 | A1 | 12/2004 | Sakai et al. |
| 2005/0008163 | A1 | 1/2005 | Leser |
| 2005/0222960 | A1 | 10/2005 | Hatlelid |
| 2006/0053267 | A1 | 3/2006 | McDonald et al. |
| 2008/0052485 | A1 | 2/2008 | Mosek |
| 2008/0134202 | A1 | 6/2008 | Craggs et al. |
| 2008/0282229 | A1 | 11/2008 | Kim |
| 2008/0313301 | A1 | 12/2008 | Jewett et al. |
| 2009/0106234 | A1 | 4/2009 | Siedlecki et al. |
| 2009/0135976 | A1 | 5/2009 | Ramakrishnan et al. |
| 2010/0049821 | A1 | 2/2010 | Oved |
| 2010/0332401 | A1 | 12/2010 | Prahlad |
| 2011/0258405 | A1 | 10/2011 | Asaki |
| 2011/0282921 | A1* | 11/2011 | Dodge ................ G06F 16/9535 707/822 |
| 2012/0144139 | A1* | 6/2012 | Brunswig ........... G06F 21/6209 711/E12.091 |
| 2013/0151711 | A1 | 6/2013 | Jackson |
| 2014/0282457 | A1 | 9/2014 | Chow et al. |
| 2015/0026417 | A1 | 1/2015 | Guo |
| 2015/0220354 | A1 | 8/2015 | Nair |
| 2015/0244705 | A1 | 8/2015 | Flamini et al. |
| 2015/0356003 | A1 | 12/2015 | Koh et al. |
| 2016/0077926 | A1 | 3/2016 | Mutalik |
| 2016/0314075 | A1 | 10/2016 | Moudgill |
| 2016/0335180 | A1* | 11/2016 | Teodorescu ......... G06F 16/2428 |
| 2016/0335293 | A1* | 11/2016 | Teodorescu ......... G06F 3/04895 |
| 2016/0335329 | A1* | 11/2016 | Teodorescu .......... G06F 16/144 |
| 2016/0335330 | A1* | 11/2016 | Teodorescu ....... G06F 16/24534 |
| 2017/0004153 | A1 | 1/2017 | Carter |
| 2017/0269863 | A1 | 9/2017 | Wada |
| 2017/0286446 | A1 | 10/2017 | Altaparmakov |
| 2018/0145941 | A1 | 5/2018 | Jeon et al. |
| 2018/0234922 | A1 | 8/2018 | Meredith |
| 2019/0173949 | A1 | 6/2019 | Inomata |
| 2021/0019263 | A1 | 1/2021 | Linke |

OTHER PUBLICATIONS

Office Action dated Nov. 2, 2018; U.S. Appl. No. 15/821,390, filed Nov. 22, 2017; 24 pages.
Final Office Action dated Feb. 25, 2019; U.S. Appl. No. 15/821,390, filed Nov. 22, 2017; 20 pages.
Advisory Action dated May 13, 2019; U.S. Appl. No. 15/821,390, filed Nov. 22, 2017; 10 pages.
Office Action dated Jun. 27, 2019; U.S. Appl. No. 15/821,390, filed Nov. 22, 2017; 21 pages.
Final Office Action dated Oct. 3, 2019; U.S. Appl. No. 15/821,390, filed Nov. 22, 2017; 28 pages.
Advisory Action dated Dec. 16, 2019; U.S. Appl. No. 15/821,390, filed Nov. 22, 2017; 3 pages.
Office Action dated Jan. 17, 2020; U.S. Appl. No. 15/821,390, filed Nov. 22, 2017; 26 pages.
Final Office Action dated Apr. 28, 2020; U.S. Appl. No. 15/821,390, filed Nov. 22, 2017; 26 pages.
Advisory Action dated Jul. 15, 2020; U.S. Appl. No. 15/821,390, filed Nov. 22, 2017; 7 pages.
Office Action dated Aug. 26, 2020; U.S. Appl. No. 15/821,390, filed Nov. 22, 2017; 29 pages.
Final Office Action dated Dec. 8, 2020; U.S. Appl. No. 15/821,390, filed Nov. 22, 2017; 28 pages.
Advisory Action dated Mar. 10, 2021; U.S. Appl. No. 15/821,390, filed Nov. 22, 2017; 6 pages.
Office Action dated Apr. 16, 2021; U.S. Appl. No. 15/821,390, filed Nov. 22, 2017; 27 pages.
Notice of Allowance dated Aug. 23, 2021; U.S. Appl. No. 15/821,390, filed Nov. 22, 2017; 12 pages.
Notice of Allowance dated Mar. 3, 2022; U.S. Appl. No. 17/064,340, filed Oct. 6, 2020; 28 pages.
Final Office Action dated Jun. 16, 2023; U.S. Appl. No. 17/825,707, filed May 26, 2022; 7 pages.
Office Action dated Feb. 4, 2019; U.S. Appl. No. 15/821,374, filed Nov. 22, 2017; 11 pages.
European Extended Search Report; Application No. 18207357.7; dated Mar. 20, 2019; 11 pages.
Blain, D. et al.: "Dynamic Link Libraries—What is a DLL and How Does It Work?"; Real-World Programming for OS/2 2.1; Jan. 1, 1993; 31 pages.
Duncan, Ray: "OS/2 Dynamic Link Libraries", Programmer's Journal; vol. 7, No. 2; Mar. 1, 1989; 7 pages.
Final Office Action dated Jul. 11, 2019; U.S. Appl. No. 15/821,374, filed Nov. 22, 2017; 16 pages.
European Extended Search Report; Application No. 18207356.9; dated Apr. 16, 2019.
Advisory Action dated Sep. 23, 2019; U.S. Appl. No. 15/821,374, filed Nov. 22, 2017; 3 pages.
Office Action dated Oct. 18, 2019; U.S. Appl. No. 15/821,374, filed Nov. 22, 2017; 12 pages.
Final Office Action dated Feb. 26, 2020; U.S. Appl. No. 15/821,374, filed Nov. 22, 2017; 7 pages.
Advisory Action dated May 1, 2020; U.S. Appl. No. 15/821,374, filed Nov. 22, 2017; 3 pages.
Notice of Allowance dated Jul. 1, 2020, U.S. Appl. No. 15/821,374, filed Nov. 22, 2017; 19 pages.
European Examination Report; Application No. 18207357.7; dated Mar. 31, 2021; 17 pages.
Office Action dated Jan. 6, 2023; U.S. Appl. No. 17/825,707, filed May 26, 2022; 16 pages.
Canadian Office Action; Application No. 3,022,644; dated Sep. 22, 2023; 4 pages.
European Extended Search Report; Application No. 23199681.0; dated Jan. 2, 2024; 12 pages.
Office Action dated Oct. 26, 2023; U.S. Appl. No. 17/825,707, filed May 26, 2022; 15 pages.

* cited by examiner

METHOD AND SYSTEM FOR LOW LATENCY DATA MANAGEMENT

CROSS-REFERENCE TO RELATED APPLICATIONS

This application is a continuation of U.S. patent application Ser. No. 15/821,390 filed Nov. 22, 2017 by Scott Lee Linke entitled, "Method and System for Low Latency Data Management", which is incorporated by reference herein as if reproduced in its entirety.

FIELD OF THE DISCLOSURE

The present disclosure relates to data management systems, and in particular relates to data management systems having latency sensitive subscribers.

BACKGROUND

Data management has many definitions, implementations and expectations. The basic concepts of data object storage allocation, data acquisition, data storage, data availability notification and data object storage reclamation constitute a simplistic view of a data object's lifecycle. Depending on the use case, a data management system may manage data objects with very short life cycles or very long life cycles with respect to time. For example, a short life cycle piece of data may include a camera image. A long lifecycle may include video surveillance archives, among other options.

Overall, the ways to achieve such data management systems have been the subject of much research and have led to a diversity of implementations. Data management systems recognize various parameters of the lifecycle, but typically focus on optimizing only a few of the parameters for very specific use cases. This typically results in very tightly coupled systems in which the creators of data are known, the type and amount of data that is created is known, and the users of such a data are tightly tied to such data creators.

However, such tightly coupled system creates a rigid system in which it becomes difficult to replace components without also replacing software or algorithms used for such data management.

BRIEF DESCRIPTION OF THE DRAWINGS

The present disclosure will be better understood with reference to the drawings, in which.

DETAILED DESCRIPTION OF THE DRAWINGS

Figure 1:
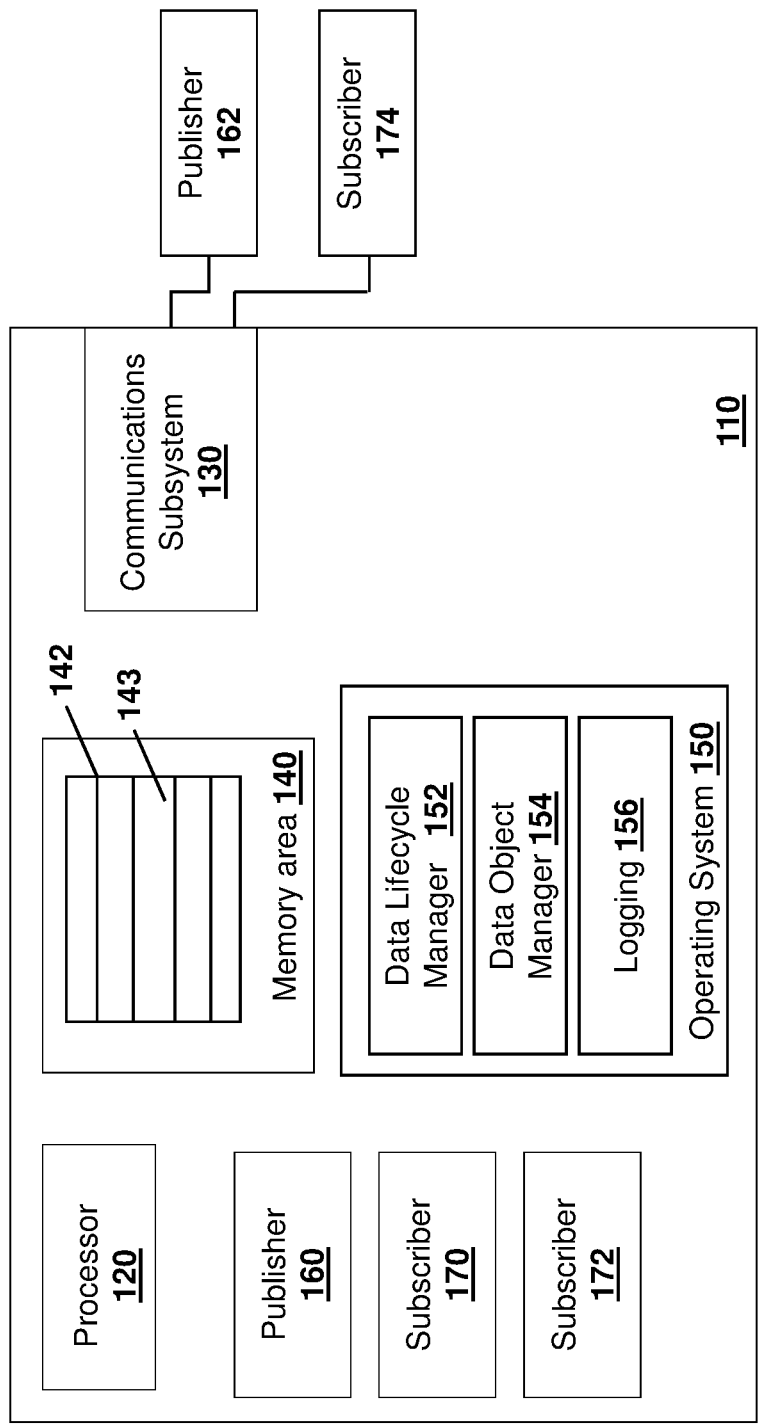
FIG. 1 is a block diagram of an example computing device capable of being used with the embodiments of the present disclosure.

The present disclosure provides a method at a computing device for data management between a publisher and at least one subscriber, the method comprising: receiving, at a system element, memory requirements from the publisher; creating a memory allocation of a pool of data objects for the publisher based on the received memory requirements; receiving, at the system element, consumption criteria from each of the at least one subscriber; and adjusting the memory allocation of the pool of data objects based on the consumption criteria received from the at least one subscriber.

The present disclosure further provides a computing device configured for data management between a publisher and at least one subscriber, the computing device comprising: a processor; a system element for data management between the publisher and the at least one subscriber; memory; wherein the computing device is configured to: receive, at the system element, memory requirements from the publisher; create a memory allocation of a pool of data objects in the memory for the publisher based on the received memory requirements; receive, at the system element, consumption criteria from each of the at least one subscriber; and adjust the memory allocation of the pool of data objects based on the consumption criteria received from the at least one subscriber.

The present disclosure further provides a computer readable medium for storing instruction code, which when executed by a processor of a computing device configured for data management between a publisher and at least one subscriber, cause the computing device to: receive, at a system element, memory requirements from the publisher; create a memory allocation of a pool of data objects for the publisher based on the received memory requirements; receive, at the system element, consumption criteria from each of the at least one subscriber; and adjust the memory allocation of the pool of data objects based on the consumption criteria received from the at least one subscriber.

In accordance with the present disclosure, a system having a subscriber and publisher model, with a system level element managing the memory allocation of a collection or pool of data objects for publishers, is provided. Throughout the present disclosure the use of terms "data object(s)", "blob(s)" "blobs of data" and "data blob(s)" are interchangeable, as is the use of terms "pool of data objects", "pool of blobs", "data object pools" and "blob pools". The system level element has no knowledge of the data or data types provided by the publisher, but rather receives information from publishers and subscribers about the number and size of blobs of data that need to be allocated. This allows for a system in which publishers and subscribers can be replaced without having to recreate the entire system.

Specifically, traditional implementations of data management systems either devolve to a single subscriber and a single publisher, a tightly coupled buffer strategy such as a ping-pong buffer or sometimes a "three-bucket" buffer system in one case. Such systems may be considered to be very low or "zero" latency due to the tightly coupled nature of the publisher and subscriber data exchange policy. The applicability of such implementations are, however, extremely narrow, discourage multiple subscribers, and only consider the data lifecycle characteristics of the publisher.

In other implementations, when multiple subscribers are involved, a data copy messaging service is traditionally employed. This type of service creates copies of data, which creates latency that correlates to the number of copies and the size of the data "blob". Generally, such implementations will attempt to minimize the "blob" size to reduce the latency, and defer the actual data transfer to an auxiliary agreed-upon mechanism between publisher and subscriber. Thus, such solutions devolve into a messaging system. An example of data exchange in such systems would typically include a small message containing a handle that refers to a privately determined region of the shared memory between the publisher and subscriber that actually contains the "blob". If the subscriber consumes data synchronously to the publisher, such system effectively becomes a ping-pong system and a copy may not be required. In this case latency is a function of the message pass. Otherwise, each subscriber is responsible for the maintenance of the "blob" lifecycle by copying it away before the publisher overwrites it.

Thus, in accordance with the present disclosure, a very low latency data management approach, referred to as a "zero latency data management" (ZLDM) implementation, creates a service that would utilize, in some embodiments, an existing operating system (OS) set of services. The use of the term "zero latency" refers to a system in which the latency between the publisher publishing data and a subscriber receiving data is only limited by the number of clock cycles required to provide a notification to the subscriber. Specifically, zero latency notification implies that the notification delay from the publisher to the subscriber is affected only by operating system scheduling latencies. Thus, the notification is a non-preemptive operating system function performed immediately after a publisher publishes a data object. In practice, such a system may use a single clock cycle or minimal number of clock cycles to provide the notification. Thereafter, depending on the number of cores in a processor, the system may prioritize threads to allow access to the data that the subscriber desires.

Further, in some embodiments of the present disclosure, the concept of a dynamically linked library may be expanded to include a dynamically linked data library. Traditionally, an operating system views executables such as threads or interrupt handlers, very differently from data. Data is allocated and accessed. Executables are scheduled and executed. Although executables also need to be allocated, the different handling may impose limitations. Therefore, in accordance with one embodiment, the present disclosure recognizes that the distinction between data and executable can be redefined or extended such that data can inherently become schedulable and be viewed as executable in terms of memory allocation.

A typical operating system has some notion of schedulable data in the form of semaphores, mutual exclusion objects (mutexes) and conditional variables (condvars). Such schedulable data may be used, with slight extension, in connection with other data, depending on the operating system.

Thus, in one embodiment, one implementation may redefine or extend the nature of a Dynamically Linked Library (DLL) or other similar shared library to include shared data objects. This DLL construct is widely supported and used to allow applications to incorporate executable services provided or published within the DLL. A characteristic of a DLL is that the executable memory is allocated once as physical memory, and shared by mapping that allocation to each user's virtual memory. However, under traditional systems, data is not shared and is allocated individually and separately within each user's virtual memory space. In accordance with the present disclosure, an extension could be implemented where all of the data "blobs" are allocated in a similar manner to the executable memory, once in physical memory, and then shared or mapped into each user's virtual memory space. This would involve a change in the DLL loader for the operating system. The shared executable within the DLL would contain the controller logic managing the lifecycle of blobs and the shared data would enable immediate or zero latency access for both publisher and subscriber(s).

As described below, current DLL behavior could be sustained to allow multiple instances of a publisher and subscriber(s) sets to share the executable, and individually allocate unshared data while additionally allocating shared data memory for the pool of data objects.

Therefore, in accordance with the embodiments of the present disclosure, the data management may be implemented on a computing device. One example of a computing device is shown with regards to FIG. 1. The computing device of FIG. 1 is however merely an example and other computing devices could equally be used in accordance with the embodiments of the present disclosure.

Reference is now made to FIG. 1, which shows an example computing device 110. Computing device 110 can be any device or network node. Such computing device or network node may include any type of electronic device, including but not limited to mobile devices such as smartphones or cellular telephones, fixed computers, laptop computers, Internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Computing device 110 includes a processor 120 and may include at least one communications subsystem 130. Communications subsystem 130 may, in some embodiments, comprise multiple subsystems, for example for different radio technologies. Communications subsystem 130 may allow computing device 110 to communicate with peripherals or other devices or other network elements. For example, communication subsystem 130 may be equipped to support Universal Serial Bus (USB), FireWire, High-Definition Multimedia Interface (HDMI), among other short range wired communications. In other embodiments, communication subsystem 130 may use one or more of a variety of communication types, including but not limited to cellular, satellite, Bluetooth, Bluetooth Low Energy, Wi-Fi, wireless local area network, near field communications (NFC), IEEE 802.15, wired connections such as Ethernet or fiber, among other options.

A communications subsystem 130 for wireless communications will typically have one or more receivers of transmitters, as well as associated components such as one or more antenna elements, local oscillators (LOs) and may include a processing module such as a digital signal processor (DSP). As will be apparent to those skilled in the field of communications, the particular design of the communication subsystem 130 will be dependent upon the communication network or communication technology on which the computing device is intended to operate.

Processor 120 generally controls the overall operation of the computing device 110 and is configured to execute programmable logic or code, which may be stored, along with data, using a memory area 140. In some embodiments, processor 120 may include a single core. In other embodiments, processor 120 may include a plurality of cores, where each core may process threads or elements separately.

Memory area 140 can be any tangible, non-transitory computer readable media storage medium, including but not limited to random-access memory bracket (RAM) within a processor, flash drive, hard drive, optical (e.g. CD, DVD, ETC.), magnetic (e.g. tape) or other memory known in the art.

Alternatively, or in addition to memory 140, computing device 110 may access data or programmable logic or executable code from an external storage medium, for example through a communications subsystem 130.

Overall operation of the processor 120 and computing device 110 is done utilizing an operating system 150. As described below, the operating system 150 may have various elements, including a data lifecycle manager 152, a data object manager block 154 and a logging function 156.

In accordance with the present disclosure, the data management uses a publisher and subscriber paradigm. In particular, the publisher and subscriber paradigm is a basic framework where data producers will publish their data and data consumers will subscribe to the data. As seen in FIG. 1, publishers may be applications or processes within the computing device 110, shown as publisher 160. In other embodiments, publishers may be external devices connected through a communication subsystem 130, shown as publisher 162. Depending on the publisher, in some embodiments it may include a computing device such as computing device 110, with a processor 120, communications subsystem 130 and memory area 140. Examples of publishers include, but are not limited to, applications or processes, sensors or peripherals such as cameras, radar, lidar, positioning sensors, temperature sensors, accelerometers, vibration sensors, tilt sensors, among other options.

Similarly, a subscriber may be an internal application within computing device 110, as seen by subscribers 170 and 172. Subscribers may also be external computing devices or peripherals which may connect to computing device 110 through a communication subsystem 130, as shown by subscriber 174 in the embodiment of FIG. 1. Depending on the subscriber, in some embodiments it may include a computing device such as computing device 110, with a processor 120, communications subsystem 130 and memory area 140.

In some embodiments, a typical publisher could be an input driver and a typical subscriber could be an output driver. Further, intermediate data processing algorithms (data in, data out) could be both subscribers and publishers in accordance with the embodiments of the present disclosure.

As described below, the data type or format definition between a publisher and subscribers is expected to be predefined and known by both the publisher and subscriber either by formal design or through a format discovery services. A publisher is responsible for declaring information about data objects it will produce so a pool can be created. A subscriber is responsible for declaring consumption behavior information that may affect the size of the pool.

In the embodiments described below, a data manager provides the ability to dynamically grow the pool according to subscriptions and the pool may be adjusted as subscriptions are made or if the publisher should ever experience an underflow.

Operating system 150 may include a plurality of functions, that can support a data object manager (DOM) function 154. While the embodiment of FIG. 1 shows the DOM 154 within the operating system, in other embodiments DOM 154 may be in other areas. Specifically, there are multiple embodiment options for implementing the DOM. It could be integrated into the OS as a service, offered as the executable portion of a Dynamically Linked Data Library ("DLDL"), as described below with regards to FIG. 7 to 9, or may be a service outside the OS.

The DOM 154 is responsible for the creation of data object pools according to the requirements of publishers and subscribers. The DOM 154 abstracts the creation of a pool in a region of shared memory that is mapped into its own virtual memory space, as well as the publishers and subscriber's virtual memory space, as provided below. In one embodiment, the DOM 154 is tightly coupled to the operating system kernel to support optimal performance for allocation, mapping and information update actions. For example, functionality requiring multiple round-trip kernel calls may be merged into a single call.

The data lifecycle manager (DLM) 152 is used to manage data objects within a pool 143 of memory area 140. The publisher needs to request a free data object from the DOM 154 in preparation for publishing its next data set. Once the data object is fully populated the data object will be released or published to the DOM. At that point, the publisher will no longer own the data object and must not modify its contents. However, the data object has not yet been released or freed within the DOM. The DOM 154 will add the object's index to a published object queue 142 and notify the data lifecycle manager 152 with the publisher identifier, a subscriber identifier list, and a data object handle. The DOM may then issue a notification to the current subscriber identifier list.

The data lifecycle manager 152 effectively distributes the ownership of the data object among the received subscriber list. Each subscriber in the list returns or frees the data object handle associated with the publisher identifier before the DLM 152 will request the DOM 154 to release or de-queue the data object from the published object queue and return it to the respective pool.

As with the DOM 154, DLM 152 can be implemented in various ways in different embodiments. While the embodiment of FIG. 1 shows the DLM 152 within the operating system, in other embodiments DLM 152 may be in other areas. Specifically, there are multiple embodiment options for implementing the DLM. It could be integrated into the OS as a service, offered as the executable portion of a "DLDL", as described below with regards to FIG. 7 to 9, or may be a service outside the OS.

In one embodiment, the queue 142 may be a first in, first out (FIFO) queue. With the use of a FIFO queue it is possible to log "out of order" object releases.

In one embodiment, additional attributes may be assigned to a pool such that the DLM 152 may manage lifetime limits. These can be unique to the publisher or system-level limits that can indicate a subscriber's failure to consume and release an object. This will enable the DLM 152 to take additional actions such as error logging and defensive notification to the DOM 154, such as directives to un-map the data objects so any future access will trap into error handlers or recovery notifications to application monitors.

Operating system 150 may further have logging functionality 156. Since the data management may be a core service for applications and processing systems that create and exchange data, real-time zero latency behavior may be critical in the ability to verify and analyze the interactions between publishers and subscribers may equally be critical. A variety of status and logging information may be needed to enable such verification or analysis.

The logging activity, as shown by logging functionality 156, typically should not create a significant burden such that it impacts the performance of the data management. For example, an increased latency between a publisher release and the notification due to a logging action may be unacceptable. In such a case, the logging facility could take a timestamp following the release, but delay logging activity until after the notification. Similarly, a subscriber could timestamp upon receipt of the data, but may defer logging if the reaction for processing the data has time critical deadlines that cannot be impacted. Logging is described in more detail below.

Publisher

In accordance with the present disclosure, in the publish/subscribe model of data management, data is produced by a publisher. The process of becoming a publisher requires the DOM to create an initial data object pool according to criteria provided by the publisher.

Figure 2:
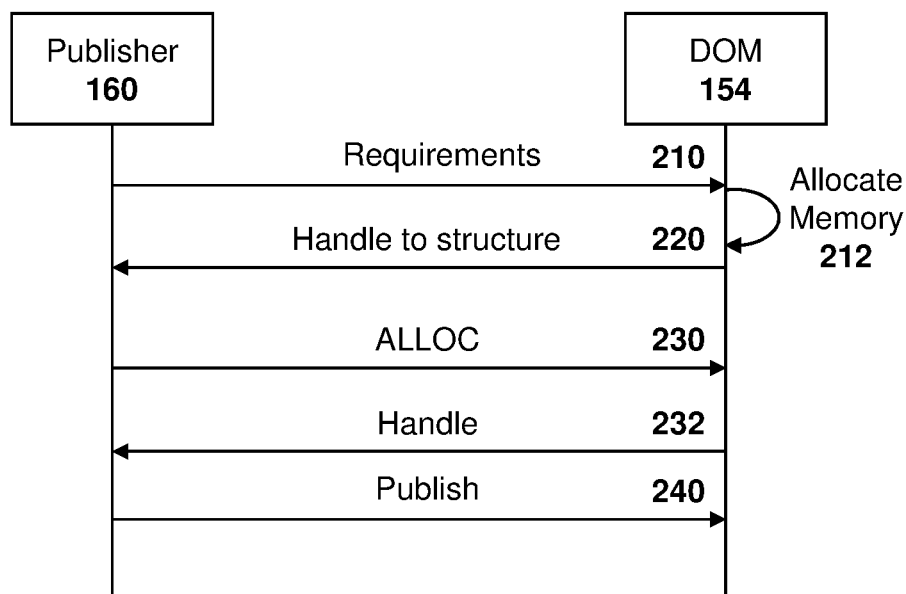
FIG. 2 is a dataflow diagram showing the allocation of memory by an operating system function to a publisher.

In particular, reference is now made to FIG. 2. In the embodiment of FIG. 2, a publisher 160 communicates with the DOM 154.

In particular, a publisher 160 provides its requirements to the DOM 154, as shown by message 210. Such requirements may include the maximum size of its data object, a minimum number of objects it needs in its pool, a minimum time interval between any two updates, among other options.

On receiving message 210, the DOM 154 may make the physical memory allocation of a pool of data objects, map the allocation into a publisher's virtual memory space, and return a handle to that structure that contains the object pool's information, including size, among other options. The memory allocation is shown by arrow 212 in the embodiment of FIG. 2. Further, the handle is returned in message 220.

Message 220 may further include a reference to an indexed list or array of pointers such as a virtual address (vaddr) or physical address (paddr) for the set of data objects in the pool.

The structure and list are also used by DOM 154 and mapped onto a publisher's virtual memory space. The size of such memory space may grow if the pool size grows due to subscriptions.

In one embodiment, the list may be constrained to fit within a single Memory Management Unit (MMU) page. For example, a 4 kB page could hold 256 handles referencing a 64 bit virtual and physical address pair.

The structure returned at message 220 is read only by publisher 160 and can be modified by DOM 154.

Further, synchronization between publisher 160 and DOM 154 is not required since the DOM will never provide an index (a data object handle) until all structure elements are valid.

From a publisher's perspective, publisher 160 may then request a data object by providing an allocation call to DOM 154, shown by message 230 in the embodiment of FIG. 2. Based on message 230, the publisher 160 may receive a valid handle or index that provides reference to an object in the pool, shown by message 232. The publisher now effectively owns the object provided with a handle at message 232 and can take the physical address for use in peripheral and/or direct memory access transactions.

Once finished writing to the allocated memory, a publisher can release or publish the data back to the DOM, shown by message 240. Such publishing does not free the data object back into the pool. Instead, ownership is transferred from the publisher 160 to the DLM 152. Once published, only the DLM 152 can free a data object back to the pool.

Prior to publishing a data object, the publisher can also cancel the allocation (not shown).

If a publisher's attempt to acquire a free data object fails, for example if no free data objects are in the pool, the DOM 154 can be configured to grow the pool in addition to logging a fault. This would allow the publisher to recover from the error and remain operational. However, in some embodiments, testing regimens may enable developers to characterize the maximum pool size required for a system and have a publisher's initial request declare such pool size.

In one embodiment, the DOM 154 may take measures to protect unallocated and published data objects from a publisher. Methods could be hardware based, such as central processing unit MMU, input/output MMU, among other options. In other embodiments, the DOM 154 could invalidate or null the handle pointer values if unauthorized writes occur.

In one case, a publisher 160 may invalidate all handle references after sending publishing message 240. In some embodiments, a zero index could be considered invalid and hold no pointers.

Subscriber

Figure 3:
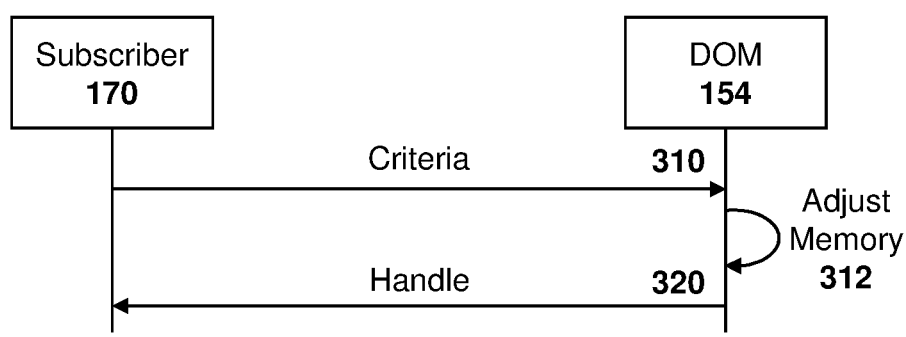
FIG. 3 is a dataflow diagram showing the adjustment of allocated memory by an operating system function based on receipt of subscriber information.

Reference is now made to FIG. 3. In a similar fashion to publishers, subscribers 170 can impact the size of the data pool object based on their criteria. Such criteria includes the maximum time duration that a subscriber may hold an object as active, as well as a maximum number of objects it may concurrently hold as active, among other criteria.

In this regard, when making a subscription, subscriber 170 may provide information or criteria to DOM 154, as shown with message 310.

The DOM 154, based on the criteria received by subscriber 170, may adjust the allocated memory for a particular publisher, shown by arrow 312.

Specifically, in some cases, subscribers will need to hold on to a plurality of data objects in order to perform processing. Further, the processing rate of the subscriber for the data object may affect the number of data objects that need to be kept for a particular publisher. In this case, the subscriber may cause the pool to grow.

Any pool growth will be reflected to the publisher and existing subscribers as additional or larger shared memory mappings, and each will be provided with more valid entries in the index data object handle array. The subscriber will have the enlarged pool mapped into its virtual memory address space.

As more subscribers subscribe to a publisher's data objects, the process will repeat so that the pool will satisfy the largest size needed for the plurality of subscribers.

After the DOM 154 checks the allocated memory based on the criteria received in message 310 and potentially adjusts the memory allocation at arrow 312, a handle is returned in message 320 to the subscriber 170.

Message 320 may further include a reference to an indexed list or array of pointers such as a virtual address (vaddr) or physical address (paddr) for the set of data objects in the pool.

The publisher and all contents subscribers' mappings will be updated as the pool grows. All data object mappings will be read only by subscribers. A subscriber may cancel a subscription at any time.

DOM 154 may typically generate a unique identifier for each publisher and for each subscriber, independent of the publishers. In some embodiments, the unique identifier may never be reused. For example, a 64 bit incrementing value or random number, among other options, may be assigned to each subscriber and publisher.

The contents of a data object are not known by the DOM 154. The association between publishers and subscribers includes an agreed definition of the data content and structure is defined by the publisher and subscriber's subscription. A data content discovery model could be created, whereby the publisher creates a singular definition object that subscribers could interrogate and decide whether a subscription to a publisher's data object is useful.

Shared Memory

Figure 4:
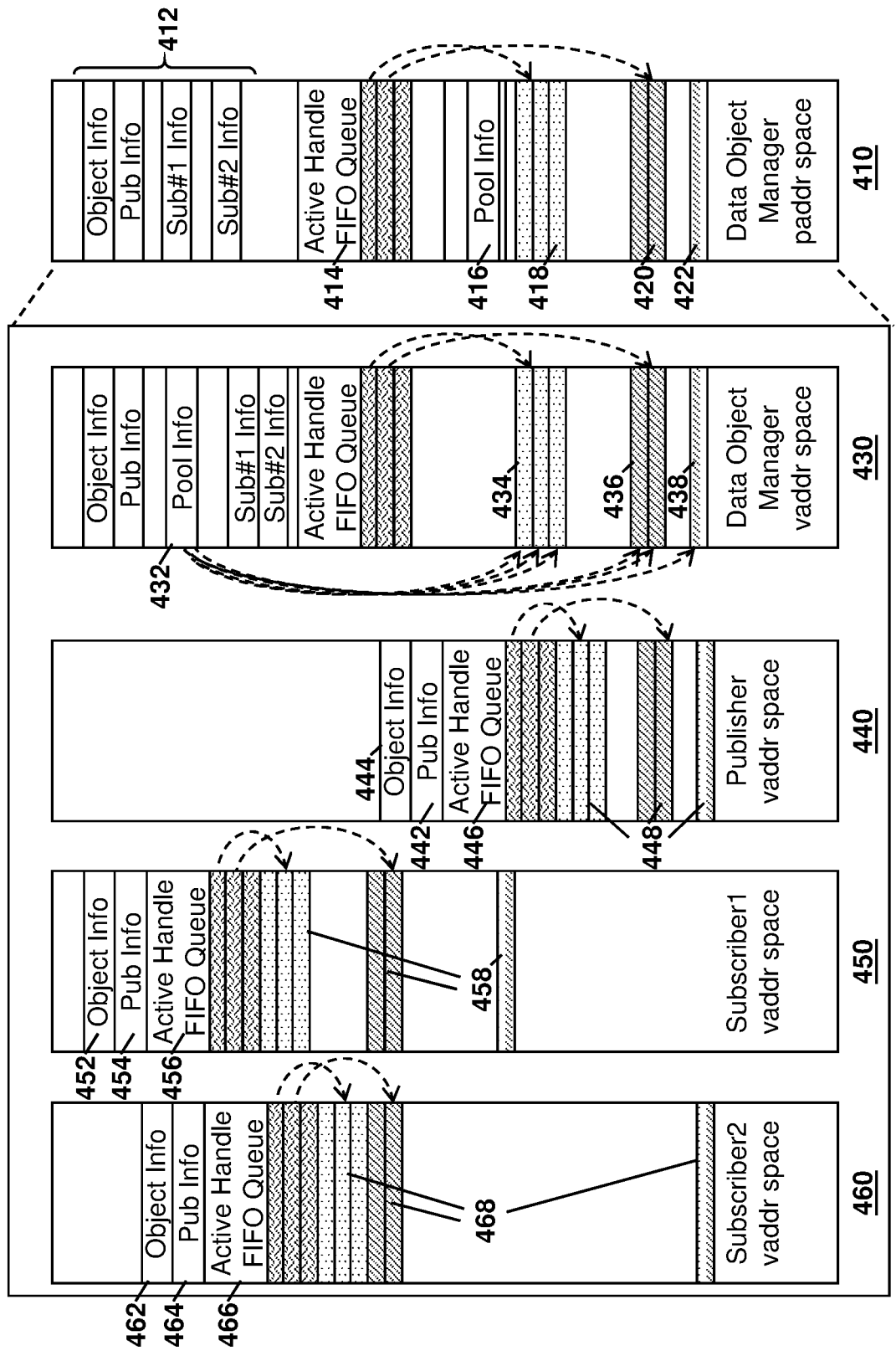
FIG. 4 is a block diagram showing mapping of virtual memory in different system components to a physical address space.

Reference is now made to FIG. 4, which shows an example shared memory for use between the data object manager, publisher and subscribers.

In particular, a data object manager physical address space 410 include memory areas for object information, publisher information and subscriber information, shown by area 412.

Further, an active handle for a memory queue is shown at area 414.

The pool information 416 may include an initial publisher pool 418 as well as areas due to pool growth from subscribers subscribing to the pool, shown at area 420.

Pool growth due to underflow for the publisher is shown in area 422.

Individual virtual addresses map to share DOM physical addresses. Thus, a data object manager virtual memory space 430 includes object information and publisher information as well subscriber information. Pool information 432 maps to the various pool areas including the initial publisher pool 434, the pool growth due to subscribers area 436, and the pool growth due to publisher underflow area 438.

Similarly, a publisher has a virtual address space 440 which includes publisher information 442, object information 444, an active queue 446. The mappings to the various pool areas are shown in area 448.

A first subscriber has a virtual address space 450 including object information 452 and subscriber information 454. The active handle for the queue is shown at 456 and the various pool spaces are shown with areas 458.

A further subscriber has a virtual address space 460 which includes object information 462, subscriber information 464, an active handle queue 466, and a pool area 468.

Each respective physical address point is equal between the DOM, publisher and subscribers.

The mapping of virtual addresses to physical addresses in the embodiment of FIG. 4 is however merely an example and other options exist.

Based on the above, the embodiments of the present disclosure provide for anonymous shared memory between a publisher and subscriber, where the data is a "blob". Such data has no implicit data structure and the publisher and subscriber may independently agree on content. Further, as described with regard to FIGS. 2 and 3, neither the publisher nor subscriber manage or control the sharing of memory.

Further, as described with respect to FIGS. 2 and 3, the publisher or subscriber need only declare data lifecycle characteristics. The publisher declares the data object size, acquisition rates and latency expectations while the subscriber declares consumption rates, retention needs and latency. Neither the publisher nor subscriber needs to comprehend each other's data lifecycle characteristics, and thus there is no coupling between the publisher and subscriber.

Further, such characteristics may be declared dynamically at runtime or statically through a configuration file.

Also, according to the embodiments of FIGS. 2 to 4, memory allocation and management is an opaque service. Specifically, neither the publisher nor the subscriber is aware of each other's memory mappings or even aware of each other. The operating system model service associates the physical memory to virtual memory maps and the only visible behavior is the reduction in the amount of free memory when viewed from the publisher or subscriber.

In some embodiments, the DOM may determine memory allocation requirements heuristically. For example, the determination of memory requirements may use methods such as production, consumption and retention calculations.

Further, an extended policy for safeguarding against worst-case under or overflow may be implemented. For example, the DOM 154 may create a pool of data objects. However, the DOM may ensure that there will be no overrun/underrun by allocating "n+1" data objects where the "+1" is used for an overrun/underrun situation. If the +1 memory data object needs to be used, it can be allocated, a logging error may be provided and an additional data object can be added to the pool.

Data Management

When a publisher "publishes" a new data object, subscribers for that publisher require immediate (zero latency) access to the data object. Underlying this capability is the fact that the subscription process is provided a shared memory mapping of all data objects that are, or will be, part of the subscription. The handle may be an offset, or an index provided that it can be directly resolved by the subscriber to reference data in the subscriber's virtual address space, as well as the underlying physical address. Such a handle is used since it may be impossible to predict or enforce virtual memory maps across all potential subscribers so that an object's local virtual address can be unique per subscriber. Depending on the data object and previously described persistence requirements, the handle for a given notification may reference an instance in a pool of data objects, whereby each instance in the pool has a unique index and virtual address.

Figure 5:
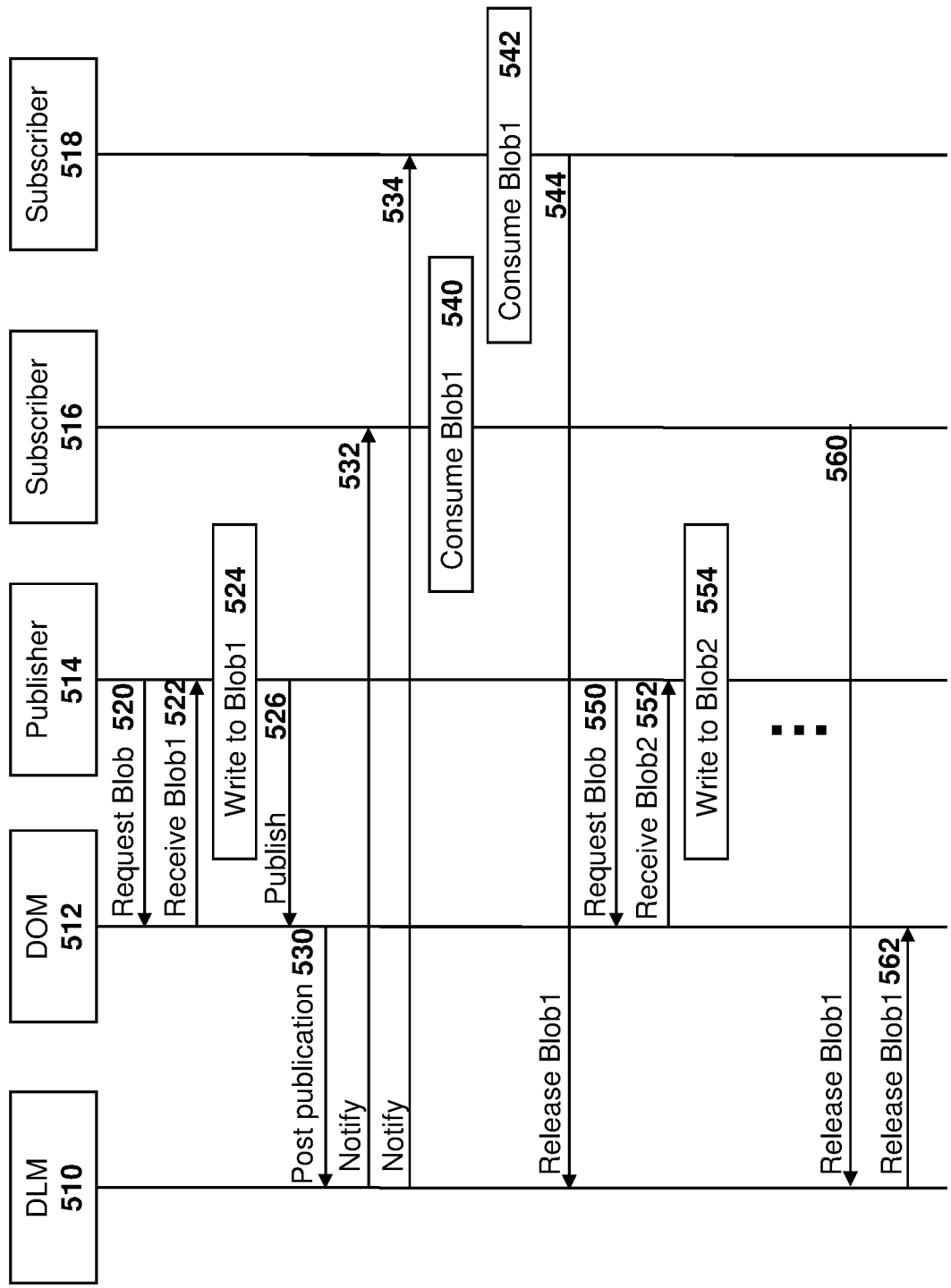
FIG. 5 is a dataflow diagram showing a process for data publishing by a publisher and consumption by a subscriber

Reference is now made to FIG. 5. The embodiment of FIG. 5 shows an example environment having a publisher and two subscribers. In the embodiment of FIG. 5, it is assumed that the publisher and subscribers have each registered with the DOM in order to provide the memory allocation, for example using the processes of FIGS. 2 and 3 above.

In the embodiment of FIG. 5 a DLM 510 provides data lifecycle management for data objects. Specifically, DLM 510 provides the functionality of DLM 152 above, and effectively distributes the ownership of the data object amongst the received subscriber list. Each subscriber in the list must return (release) the data object handle associated with the publisher ID before the DLM 610 will request the DOM to dequeue the data object from the publisher's object queue and then return it to the respective pool.

Further, the DOM 512 provides the functionality as described above with regard to DOM 154.

A publisher 514 may provide data and subscribers 516 and 518 may consume such data.

The process of FIG. 5 starts by publisher 514 requesting a blob (data object) from DOM 512, as shown by message 520.

As indicated above, the allocation heuristic allows a "blob" to always be available on request, therefore causing zero latency to allocate such blob to a publisher. The DOM 512 therefore provides an index or handle to a first blob back to publisher 514 in message 522. On receiving message 522, publisher 514 has immediate access via virtual or physical address pointers. In this regard, publisher 514 may then write to the blob, as shown by block 524.

On finishing writing the blob, the publisher 514 may publish the blob back to the DOM 512, as shown by message 526. Publishing the blob transfers ownership to the DOM 512.

DOM 512 may then post the publication to the DLM 510, shown by message 530, which may then cause notifications 532 and 534 to be sent to subscribers 516 and 518 respectively. While notifications 532 and 534 are shown to be from the DLM 510 in the embodiment of FIG. 5, in some embodiments the notifications could originate from different entities, such as DOM 512, or from a different process or operating system element. Such publishing and the notification to subscribers may be considered to inherently be an operating system scheduling event.

Further, the notification of a published blob is by virtue of such scheduling event and a thread associated with such subscriber may become "ready" or "running". As such, a blob is immediately accessible via virtual or physical address pointers and the blob is implicitly owned without any opportunity for data contents to change until the subscriber releases such blob.

Therefore, as seen in FIG. 5, on receiving notification 532, subscriber 516 may consume the blob, shown by block 540.

Similarly, on receiving notification 534, subscriber 518 may consume the blob, as shown by block 542.

In the example of FIG. 5, a subscriber 518 may only need a single blob for its processing, and therefore after consuming the blob at block 542, the subscriber 518 may release the blob by notifying the DLM 510, as shown with message 544. This notification may, for example, allow the DLM to track which subscribers own a blob and which have released such blob.

Subsequently, a publisher 514 may request a further blob, as shown with message 550. The publisher 514 may then receive a second blob as shown by message 552 from DOM 512.

The publisher 514 may then write to the blob, as shown by block 554.

The process may thereafter continue to allocate blobs, allow a publisher to write to the blobs and publish the blobs, and notify subscribers who may consume the data.

At a subsequent time, subscriber 516 may be finished with the first blob and may then release the blob, as shown by message 560 sent to the DLM 510. The DLM 510 may recognize that all subscribers have now released the first blob, and may therefore allow reuse of such blob for further write events by publisher 514 by releasing the blob to the DOM 512, as shown by message 562.

As indicated above, overwrite or underwrite protection exists within the present disclosure. In particular, if the publisher 514 requests a blob at message 550 and the allocated blobs have not yet been released, this may cause an error condition. In this case, a redundant blob may have previously been allocated, which may then be provided back to the publisher 514. However, this would raise an exception situation, which may be logged. Further, the DOM 512 may allocate further memory locations based on such underwrite or overwrite condition in some cases.

Each data object may further have access management associated with it. In particular, a trust basis could validate or invalidate references and trust that the publisher or subscriber respects the use model. In one embodiment, mappings into a publisher or subscriber memory space may be locked and privileges may be selectively or dynamically modified upon acquiring, releasing or freeing actions.

Further, in the embodiment of FIG. 5, a publisher can read or write an acquired blob until the blob is published. At that point, the publisher loses access to such blob and the blob is locked until subscribers release it.

Further, blobs are read-only to subscribers, therefore eliminating the danger of having a second subscriber receiving invalid data.

In some embodiments, the DLM could be part of the DOM. However, in other embodiments it may be separate from the DOM, for example as a different portion of the operating system or part of the DLDL library, among other options.

As provided above, zero latency notification implies that the notification delay from the publisher to the subscriber is affected only by operating system scheduling latencies. In one embodiment, the DOM maintains a linked list or first in, first out (FIFO) queue of data object handles and is associated with a shared conditional variable whose value would be the number of handles in the queue. The number of objects in the queue would implicitly indicate the number of "in use" objects. In other words, subscribers are still using such objects.

In accordance with this embodiment, subscribers would wait for a variable and, once posted, the latency of their access to the data would be a function of scheduling policy, priorities and available execution units. Subscribers would individually monitor or manage or hold the number of objects they require to be published as well as deal with scheduling delays and/or missing conditional variable postings. In this manner, zero latency notification would only guarantee a posting but not that every subscriber will run to completion prior to the next posting.

Subsequently, subscribers must maintain independent histories of the object handle queue. In accordance with this embodiment, a FIFO queue is maintained such that a data object's temporal relationship to other objects is maintained.

In general, in accordance with the embodiments described herein, subscribers will typically receive a notification, consume the data object and then release it to the DLM prior to the next notification. Before proceeding to the next notification, a subscriber may confirm that their current handle is the same as the tail of the queue. If not, then the subscriber may find its current handle's location in the queue and take the subsequent handle for processing and releasing to the DLM until the resulting content handle is the same as the tail.

DLL and DLDL

In still a further embodiment, instead of allocating virtual memory through an operating system function, in some cases a dynamic linked library could be used.

Figure 6:
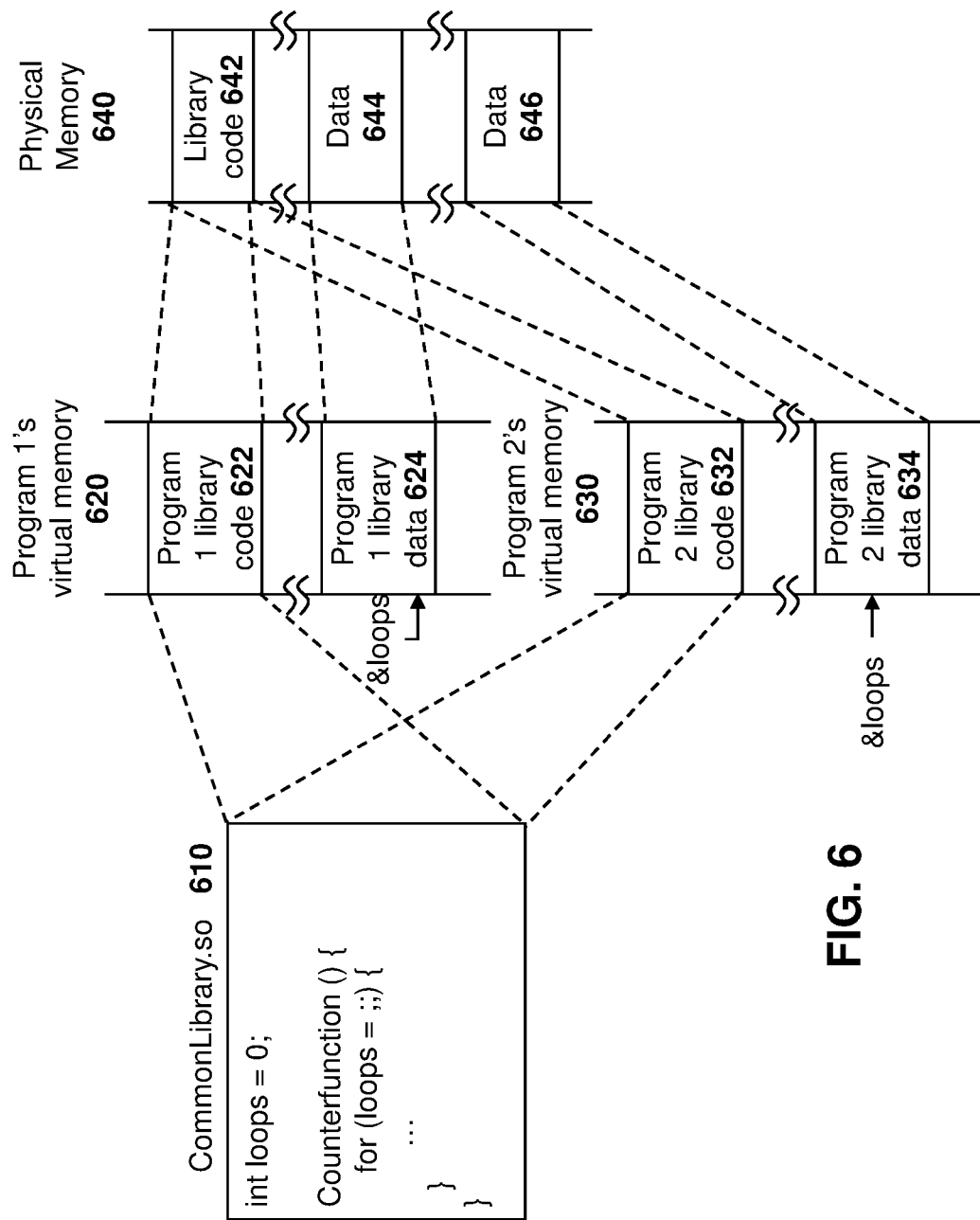
FIG. 6 is a block diagram showing the allocation of virtual memory and the mapping to physical memory utilizing a dynamic link library.

Reference is now made to FIG. 6. In the embodiment of FIG. 6 a common library 610 provides for the libraries required for a process. Similar to program memory, the library memory consists of both code and data sections. In the case of shared libraries, all processes map to the same physical location for the code section, and to unique locations for the data section.

In particular, as seen in FIG. 6, a first program's virtual memory 620 consists of library code 622 and library data 624.

Similarly, a second program's virtual memory 630 consists of library code 632 and library data 634.

Library code 622 and library code 632 map to library code 642 in physical memory 640.

Further, in the embodiment of FIG. 6, library data 624 maps to data 644 in physical memory 640.

Similarly, library data 634 maps to data 646 in physical memory 640.

Therefore, based on the embodiment of FIG. 6, the common library 610 provides library code to each process which then allows the creation of library data in virtual memory that may be mapped to a physical memory location.

While the above example in FIG. 6 provides for a shared library with separate data areas, in accordance with embodiments of the present disclosure, data objects may be shared between publishers and subscribers. Such model is referred to herein as a Dynamically Linked Data Library (DLDL) in which data objects are shared.

Figure 7:
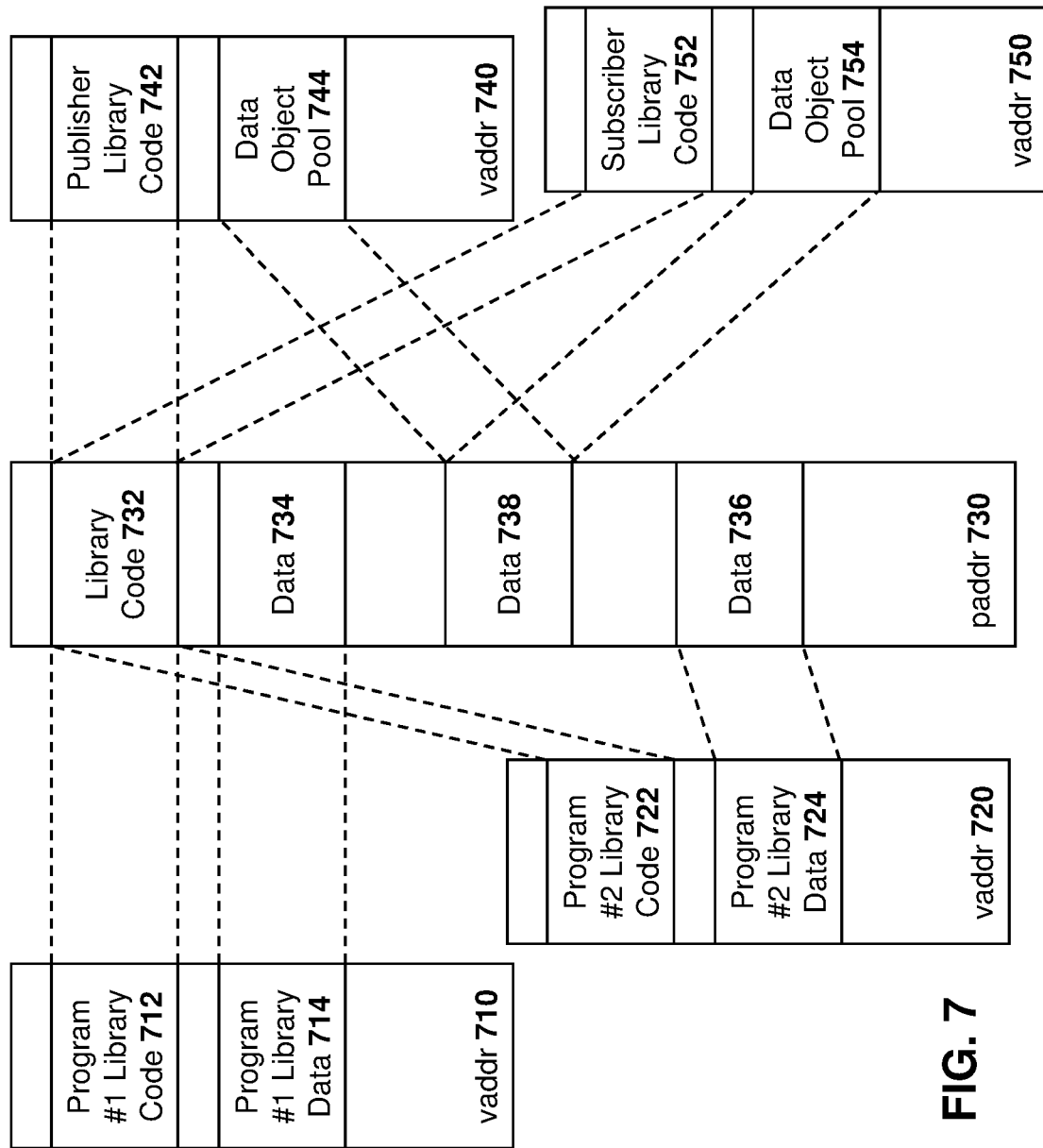
FIG. 7 is a block diagram showing a dynamic linked data object sharing library code and data.

In particular, reference is now made to FIG. 7. In the embodiment of FIG. 7, a traditionally shared library memory allocation is shown with regard to a first program and a second program. In particular, the first program, when executing a DLL, creates a memory allocation for a virtual address area 710 having a library code for the first program 712, as well as data for the first program 714.

Similarly, the second program is allocated virtual memory area 720 and has a library code 722 and data 724.

In the physical memory 730, the library code 712 and 722 both map to the physical address for library code 732. However, data 714 maps to data 734 and data 724 maps to data 736.

Conversely, in accordance with the present disclosure, a redefined shared executable code and shared data memory allocation is provided.

In particular, the virtual address area 740 for a publisher includes the publisher library code 742 as well as a data object pool 744.

Similarly, the virtual address area 750 for a subscriber includes the subscriber library code 752 and the data object pool 754.

With the model of the publisher and subscriber, the library code 742 and 752 continue to map to the physical address library code 732 location.

However, in the embodiment of FIG. 7, the data object pool 744 and data object pool 754 map to a common data object 738 in the physical memory 730.

As will be appreciated by those skilled in the art, various programs including the publisher and subscriber could have private data which will be mapped to a separate data area within the physical address memory 730. However, this private data object is not shown for clarity.

More generally, the embodiment of FIG. 7 allows for a DLDL to define a shared executable which will cause shared data to be allocated in physical memory and mapped to the virtual memory of the processes executing the DLDL. Private data areas may also be created and mapped to the virtual memory of the processes, but in this case the private data is only mapped to one process.

Therefore, in accordance with FIG. 7, the DLDL may be loaded from a first process, the loading causing a memory allocation of shared executable code, private data and shared data in a physical memory location. Once the memory allocation has occurred, it may be mapped to a virtual memory location for the first process. Similarly, the DLDL may be loaded from a second process, the loading causing mapping of the memory allocation of shared executable code and the shared data for the first process to be mapped to a virtual memory location for the second process. If private data is needed, private data may be allocated in physical memory and mapping to a virtual memory location for the second process.

Figure 8:
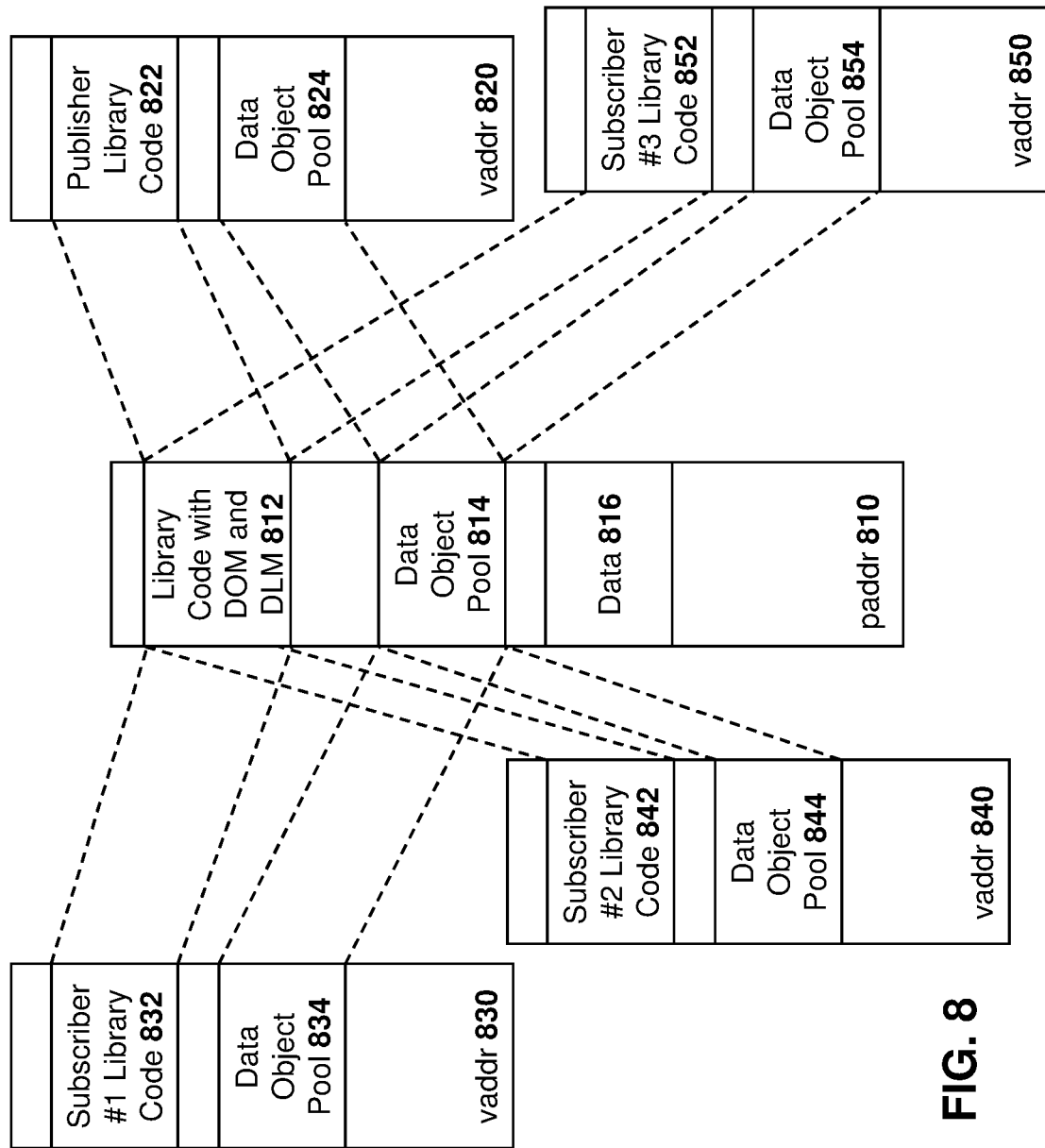
FIG. 8 is a block diagram showing a dynamic linked data object with a publisher and multiple subscribers.

Reference is now made to FIG. 8, which shows the use of a data object pool by a publisher and multiple subscribers. In particular, a physical address memory space 810 includes a library code area 812 as well as an object data pool 814.

Other data, shown as data 816 in the embodiment of FIG. 8, could include private data or data for other publishers or subscribers.

In the embodiment of FIG. 8, a publisher has a virtual address memory space 820 which includes a publisher library code 822 and an object data pool 824. In particular, once an executable for a publisher starts loading, it may refer to the library code in the DLDL, which may then allocate a data object pool 814 within the physical memory. The publisher library code 822 maps to the library code 812 and the data object pool 824 maps to the data object pool 814, thus creating the data object pool 824 in the virtual memory.

Similarly, a first subscriber has a virtual address area 830 and includes a first subscriber library code 832 as well as the data pool 834. The subscriber library code 832 maps to library code 812 and the data object pool maps to the same data object pool as the publisher, namely the data object pool 814.

A second subscriber has a virtual address area 840 including a second subscriber library code 842 and a data object pool 844. The second subscriber library code 842 maps to library code 812 and the data object pool 844 again maps to library code 814.

Further, a third subscriber has a virtual address memory area 850, including a third subscriber library code 852 and a data object pool 854. The third subscriber library code 852 maps to library code 812 and the data object pool 854 maps to the common data object pool 814.

Thus, as seen in FIG. 8, the library code may allocate an initial pool of data objects in the physical address space and then they map the same single physical address location to each loader" (e.g. publishers and subscribers) virtual address space, shown by data object pools 824, 834, 844, and 854.

The embodiment of FIG. 8 can therefore be mapped to the process of FIG. 5. Namely, the library code 812 may include the DOM and DLM. In this case, when a publisher first starts the executable, the library code, and in particular the DOM, may create a physical data object pool 814 for such publisher and may return a handle to such pool.

Thereafter, once a subscriber wants to subscribe, the executable for such subscriber is run and the DOM and DLM within the library code 812 can adjust the size of the data object pool 814 based on the subscriber requirements in the executable. This process may then continue for subscribers as they are added.

Further, the publisher, on requesting a data object pool blob, may receive write permission for that blob until the blob is published. Thereafter, the DLM within library code 812 may prevent overwrite of the data pool location until all the subscribers have also released the blob at such pool location. Thereafter, the DOM may be allowed to reallocate that blob to the publisher.

Figure 9:
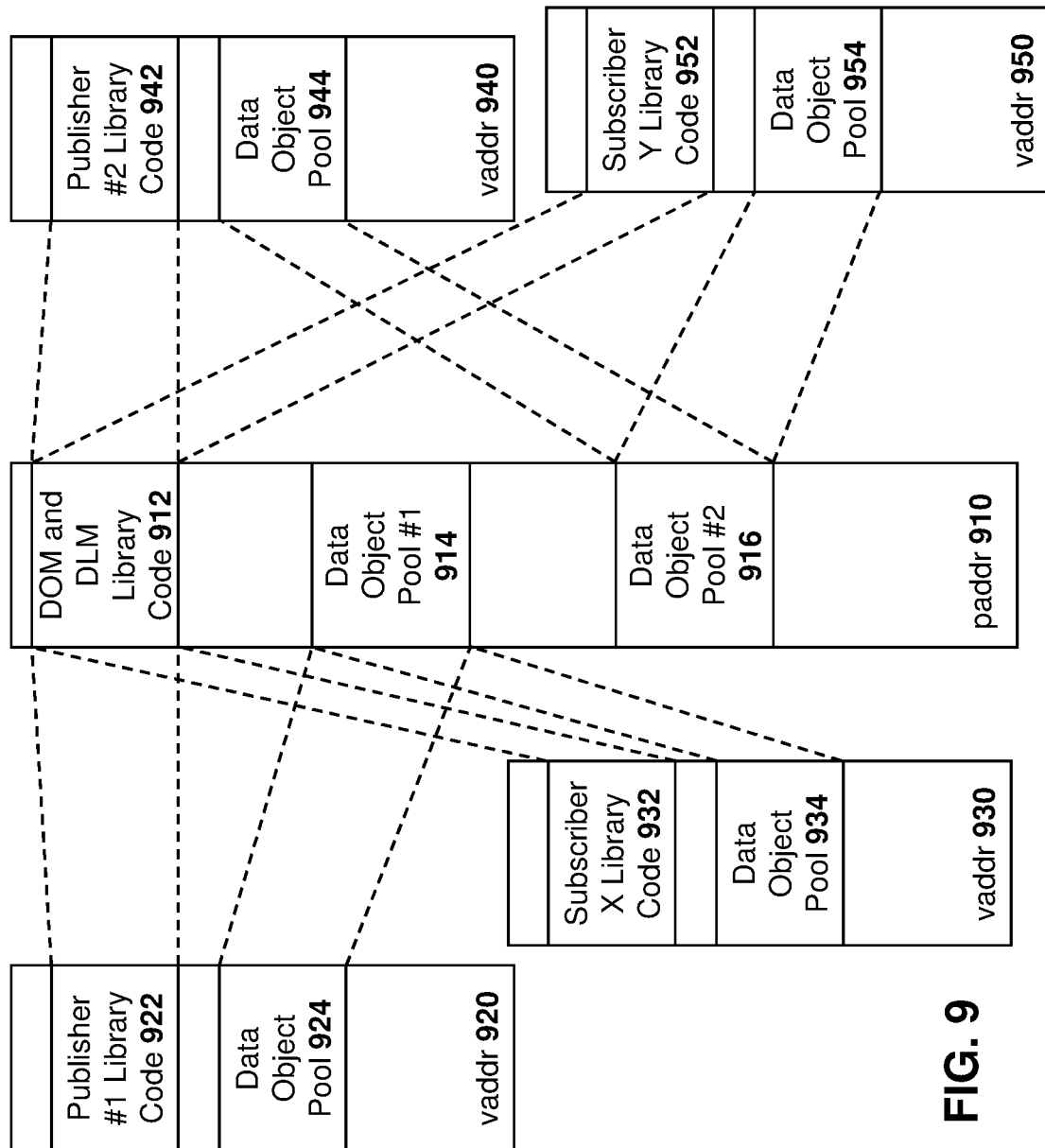
FIG. 9 is a block diagram showing a dynamic linked data object with multiple publishers and subscribers.

The embodiment of FIG. 8 may be expanded to have multiple publishers. Reference is now made to FIG. 9, which shows an example including two publishers.

In the embodiment of FIG. 9, a physical address memory space 910 includes library code 912 having the DOM and the DLM.

A first publisher be launched, and the execution may call the library 912 in the DLDL. Based on the running of the DLDL, the first publisher may be allocated a virtual address space 920. When the publisher runs its library code 922, which maps to library code 912, a first data object pool 914 may be created and mapped to the virtual address space as data object pool 924. The size of the data object pool 914 may be based on parameters or requirements of the publisher.

Thereafter, when a subscriber wishes to subscribe to the first publisher, on execution of the DLDL, the subscriber is allocated a virtual memory space 930 which includes the subscriber library code 932 and a handle to the data object pool 914, which is mapped to virtual memory space 934. Based on information from the subscriber, in some cases the size of the data object pool 914 may be adjusted The subscriber library code 932 maps to the DOM and DLM library code 912.

Similarly, when the second publisher executes the DLDL, it is allocated a virtual memory space 940 which has a library code 942 that maps to the DOM and DLM library code 912. The DOM may then create a second data object pool 916 and map such data object pool to the virtual address space as a data object pool 944. The size of the data object pool 916 may be based on parameters or requirements of the publisher.

Subsequently, when a subscriber subscribes to the second publisher, the executable for the subscriber library code in library code area 912 runs and a virtual address space 950 is created. In the virtual address space, a subscriber library code 952 maps to library code 912 and the data object pool 954 maps to the second data object pool 916. Based on information from the subscriber, in some cases the size of the data object pool 916 may be adjusted.

Based on the above, the dynamically linked data library is an extension of the well-known DLL construct in which data objects can become shared and can grow and be allocated as described above with regard to FIG. 5. As will be appreciated by those in the art, the expansion to the dynamically linked data object may need operating system level changes in order to permit such construct.

The embodiments of FIGS. 6, 7, 8, and 9 are one example of the implementation of a DOM and DLM between a publisher and one or more subscribers. However, these embodiments are merely examples. As indicated above with regard to FIGS. 2 to 5, in other cases the DOM and DLM may be created through operating system structures or other system elements. Therefore, the present disclosure is not limited to dynamically linked data libraries.

Logging

Logging is important to ensure the desired behavior is being achieved. However, logging should not add to the latency in the system. In this regard, logging could be achieved in various ways.

In one embodiment, the DOM would itself be a publisher to a single subscriber logging service. This configuration would then be validated as a special case, one to one pairing, to enable the DOM to publish log events with a low latency. The logging service would react to DOM published events as system behavior permits.

To enable publisher and subscriber data to be included, in one embodiment the shared data structure with the DOM would be populated and then retrieved by the logging service. For example, a simple queue of data object handles, plus timestamp elements, could be individually updated by a publisher or subscriber upon publish or retrieve events.

The DOM could then interrogate or consolidate the queue data and generate its log events.

In one example, a publisher may queue the handle and timestamp for a data object just prior to publishing to the DOM. After publishing, the DOM would require another timestamp just prior to the notification, and then take the publisher queue information and the publish timestamp and combine for a log event that would indicate that a publisher published a handle at a time with notifications issued at a subsequent time. The total latency increase would be the two timestamp acquisitions and the queueing function, both of which may be optimized for low latency.

In a similar fashion, a subscriber could update its queues of handle timestamp pairs for the reception of the notification and data object release events. When the DLM recognizes all subscribers have released a data object, such DLM may provide a timestamp and release to the DOM, which may then collect data from all subscribers and generate an overall log event or report on the subscriber's consumption activity.

The above therefore provides for asynchronous logging. Since the logging service is non-real time, the only requirement is to keep up to the extent that the DOM does not overflow. The logging service could forward formatted events to another service and/or create its own log data files. The latter could be highly structured data files designed for visualization tools that could efficiently post process the data.

Examples of events that could be logged are:

Publisher
- Time of creation, create attributes and subsequent pool definition information
- Time of data object allocations (success and/or failure)
  - Subsequent pool definition if automatic pool growth is enabled
- Time of data object releases Subscriber
- Time of subscription and subscriber attributes
  - Subsequent pool definition information if pool growth was required
- Time of subscriber notification received (i.e. subscriber thread scheduled)
- Time of data object release to DLM
- Time of subscription cancellation Data Object Manager
- Time of data object pool creation
- Time of publisher allocation request
- Time of publisher allocation fulfilled or failed
  - Special event if allocation success used the last available object
- Time and new definition for any pool expansion
- Time of data object release
  - by publisher
  - by DLM
- Time of subscriber notification issue
- Time of subscriber release to DLM.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device for data management, the method comprising:
   receiving a request from a publisher for memory requirements, the memory requirements including a publication rate and data size for the publication;
   allocating a block of physical memory for the publisher based on the received memory requirements, wherein a size of the block of physical memory is based on the publication rate and the data size for the publication;
   receiving, at a first system element of the computing device, a request for a data object from the publisher;
   providing a handle to the data object to the publisher;
   receiving publication of data to the data object by the publisher at the first system element;
   causing, by the first system element, notifications to be sent to at least one subscriber of the publisher;
   receiving a release of the data object by each of the at least one subscriber; and
   releasing the data object to the first system element.

2. The method of claim 1, wherein the causing comprises posting the publication of data to a lifecycle manager, and wherein the lifecycle manager sends the notifications.

3. The method of claim 1, further comprising locking the data object to the publisher on receiving the publication of data at the first system element.

4. The method of claim 1, further comprising restricting the data object to be a read-only object to the at least one subscriber.

5. The method of claim 1, further comprising:
   receiving, at the system element, consumption criteria from each of the at least one subscriber, wherein the consumption criteria include a maximum number of concurrent data objects a subscriber may hold as active;
   adjusting the block of physical memory based on the consumption criteria received from the at least one subscriber; and mapping the block of physical memory to a virtual memory of the publisher and to a virtual memory of the at least one subscriber.

6. The method of claim 5, further comprising:
receiving a further request for a data object from the publisher prior to any data objects allocated to the publisher being released; and
raising an overwrite exception.

7. The method of claim 6, further comprising allocating a redundant data object to the publisher.

8. The method of claim 1, wherein the notifications to the at least one subscriber is a non-preemptable operating system function performed immediately after the receipt of the publication notification.

9. The method of claim 1, wherein the releasing comprises returning the data object to a pool for future allocation.

10. A computing device configured for data management, the computing device comprising:
a processor;
a system element for data management between a publisher and at least one subscriber;
memory;
wherein the computing device is configured to:
receive a request from the publisher for memory requirements, the memory requirements including a publication rate and data size for the publication;
allocate a block of physical memory for the publisher based on the received memory requirements, wherein a size of the block of physical memory is based on the publication rate and the data size for the publication;
receive, at the system element of the computing device, a request for a data object from the publisher;
provide a handle to the data object to the publisher;
receive publication of data to the data object by the publisher at the system element;
cause, by the first system element, notifications to be sent to the at least one subscriber of the publisher;
receive a release of the data object by each of the at least one subscriber; and
release the data object to the first system element.

11. The computing device of claim 10, wherein the computing device is configured to cause the notification by posting the publication of data to a lifecycle manager, and wherein the lifecycle manager sends the notifications.

12. The computing device of claim 10, wherein the computing device is further configured to lock the data object to the publisher on receiving the publication of data at the first system element.

13. The computing device of claim 10, wherein the computing device is further configured to restrict the data object to be a read-only object to the at least one subscriber.

14. The computing device of claim 10, wherein the computing device is further configured to:
receive, at the system element, consumption criteria from each of the at least one subscriber, wherein the consumption criteria include a maximum number of concurrent data objects a subscriber may hold as active;
adjust the block of physical memory based on the consumption criteria received from the at least one subscriber; and
map the block of physical memory to a virtual memory of the publisher and to a virtual memory of the at least one subscriber.

15. The computing device of claim 14, wherein the computing device is further configured to:
receive a further request for a data object from the publisher prior to any data objects allocated to the publisher being released; and
raise an overwrite exception.

16. The computing device of claim 15, wherein the computing device is further configured to allocate a redundant data object to the publisher.

17. The computing device of claim 10, wherein the notifications to the at least one subscriber is a non-preemptable operating system function performed immediately after the receipt of the publication notification.

18. The computing device of claim 10, wherein the computing device is configured to release by returning the data object to a pool for future allocation.

19. A non-transitory computer readable medium for storing instruction code, which when executed by a processor of a computing device configured for data management, cause the computing device to:
receive a request from a publisher for memory requirements, the memory requirements including a publication rate and data size for the publication;
allocate a block of physical memory for the publisher based on the received memory requirements, wherein a size of the block of physical memory is based on the publication rate and the data size for the publication;
receive, at the system element of the computing device, a request for a data object from the publisher;
provide a handle to the data object to the publisher;
receive publication of data to the data object by the publisher at the system element;
cause, by the first system element, notifications to be sent to at least one subscriber of the publisher;
receive a release of the data object by each of the at least one subscriber; and
release the data object to the first system element.

20. The non-transitory computer readable medium of claim 19, wherein the instruction code causes the computing device to cause the notification by posting the publication of data to a lifecycle manager, and wherein the lifecycle manager sends the notifications.

* * * * *